United States Patent
Robideaux

(10) Patent No.: US 10,887,652 B2
(45) Date of Patent: Jan. 5, 2021

(54) SYSTEMS AND METHODS FOR PROVIDING MEDIA CONTENT FOR CONTINUOUS WATCHING

(71) Applicant: ROVI GUIDES, INC., San Jose, CA (US)

(72) Inventor: Daniel Robideaux, Morgan Hill, CA (US)

(73) Assignee: Rovi Guides, Inc., San Jose, CA (US)

( * ) Notice: Subject to any disclaimer, the term of this patent is extended or adjusted under 35 U.S.C. 154(b) by 21 days.

(21) Appl. No.: 16/296,967

(22) Filed: Mar. 8, 2019

(65) Prior Publication Data

US 2020/0288196 A1 Sep. 10, 2020

(51) Int. Cl.
*H04N 21/482* (2011.01)
*H04N 21/44* (2011.01)
*G06K 9/00* (2006.01)
*H04N 21/6587* (2011.01)

(52) U.S. Cl.
CPC ... *H04N 21/44008* (2013.01); *G06K 9/00718* (2013.01); *G06K 9/00744* (2013.01); *H04N 21/4825* (2013.01); *H04N 21/6587* (2013.01)

(58) Field of Classification Search
None
See application file for complete search history.

(56) References Cited

U.S. PATENT DOCUMENTS

| | | | |
|---|---|---|---|
| 7,761,892 B2 | 7/2010 | Ellis et al. | |
| 9,418,296 B1* | 8/2016 | Kansara | G11B 27/34 |
| 9,674,253 B2 | 6/2017 | Lin | |
| 10,178,344 B2 | 1/2019 | Patel et al. | |
| 2008/0187294 A1 | 8/2008 | Kobayashi | |
| 2009/0158326 A1 | 6/2009 | Hunt | |
| 2015/0350709 A1* | 12/2015 | Tomita | G06Q 10/02 |
| | | | 725/32 |
| 2020/0068253 A1 | 2/2020 | Kim | |

OTHER PUBLICATIONS

U.S. Appl. No. 16/296,960, filed Mar. 8, 2019, Daniel Robideaux.
International Search Report and Written Opinion from PCT/US2020/021537 dated Jun. 4, 2020.
"Option to skip TV show intros: netflix", URL:https://www.reddit.com/r/netflix/comments/2kisu9/us_option_to_skip_tv_show_intros/, pp. 1-4, Oct. 28, 2014; retrieved from the internet Jul. 13, 2016.

* cited by examiner

*Primary Examiner* — Eileen M Adams
(74) *Attorney, Agent, or Firm* — Haley Guiliano LLP

(57) ABSTRACT

Methods and systems are described for providing media content for continuous watching. A command to play a series in a continuous watching mode is received. In response, and without detecting a further command to skip a portion of an episode, a first episode of the series is generated. Then, in response to conclusion of the first episode, end credits of the first episode and title credits of a next episode of the series are automatically skipped; and the next episode of the series is automatically generated for display.

14 Claims, 12 Drawing Sheets ated into a single virtual media content, with all credits automatically skipped, while the content is played, fast-forwarded, or rewound.

SYSTEMS AND METHODS FOR PROVIDING MEDIA CONTENT FOR CONTINUOUS WATCHING

BACKGROUND

The present disclosure relates to systems for providing media content, and more particularly to systems and related processes for providing a continuous watching mode and for providing fast-forward and rewind operations in the continuous watching mode.

SUMMARY

Modern computerized media distribution systems often provide media content items that are related to each other. For example, media distributions systems can provide content that is organized into seasons, each season including several sequential episodes. Users often desire consuming such episodes continuously (e.g., by watching one episode after another). Modern media distribution systems lack the ability to allow users to watch such sequential episodes without interruption between episodes, for example, because of the time it takes to start delivering a new episode from a remote server. In addition, such systems show starting and ending credits of the episodes, wasting bandwidth and further degrading the user experience. A "skip" button may be provided for skipping past the opening credits. But, such an approach still slows down the delivery of an episode because of an inevitable user delay in pressing the skip button. Another definitely of such approaches is their poor fast-forward and rewind functionality. For example, only the currently playing episode may be rewound or fast-forwarded. If the user desires to begin rewinding a previous episode, such an episode will have to be separately requested, and only then would the rewind option become available.

To address the shortcomings of the aforementioned approaches, systems and methods for a continuous watching mode are described herein having a continuous watching mode that virtually merges multiple episodes into one virtual media content. For example, the media delivery application may receive a command to play a series in a continuous watching mode. In one example, a user may select a show and click on a "play" button after checking a "continuous watching mode" button via a user interface. After such command is received, the media delivery application begins playing the episodes of the show continuously without the need to receive any other user commands related to skipping any portions of any episode. For example, the media delivery application may begin playing a first episode and automatically skip the end credits of that episode. When the first episode concludes, the media delivery application automatically generates for display the next episode of the series while skipping the title credits of the next episode. As mentioned above, advantageously, the media delivery application performs the skips without the need to receive any user commands requesting such skips. The technique can be further extended to play multiple episodes back-to-back without interruption, creating an appearance of a single media asset. Such techniques significantly improve the operation of computerized media distribution systems by allowing automatic playing of several episodes in a row, with irrelevant portions skipped without explicit skip commands, thus optimizing the use of network resources and improving user experience.

The media delivery application may also provide fast-forward and rewind operation while operating in continuous watching mode. For example, the media delivery application may provide smooth rewind and fast-forward operations of multiple episodes as if they were combined into a single virtual media content (with all credits automatically skipped).

For example, when the media delivery application receives a rewind command while an episode of a series is being shown, the media delivery application begins rewinding it. When the episode is rewound to the beginning, the media delivery application automatically skips title credits of that episode and end credits of a previous episode of the series, and smoothly continues to rewind from the end of the previous episode. Similarly, when the media delivery application receives a fast-forward command while an episode of a series is being shown, the media delivery application fast-forwards it. When the episode has been fast-forwarded to an end, the media delivery application automatically skips end credits of that episode and title credits of a next episode of the series, and smoothly begins to fast-forward through the next episode of the series.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
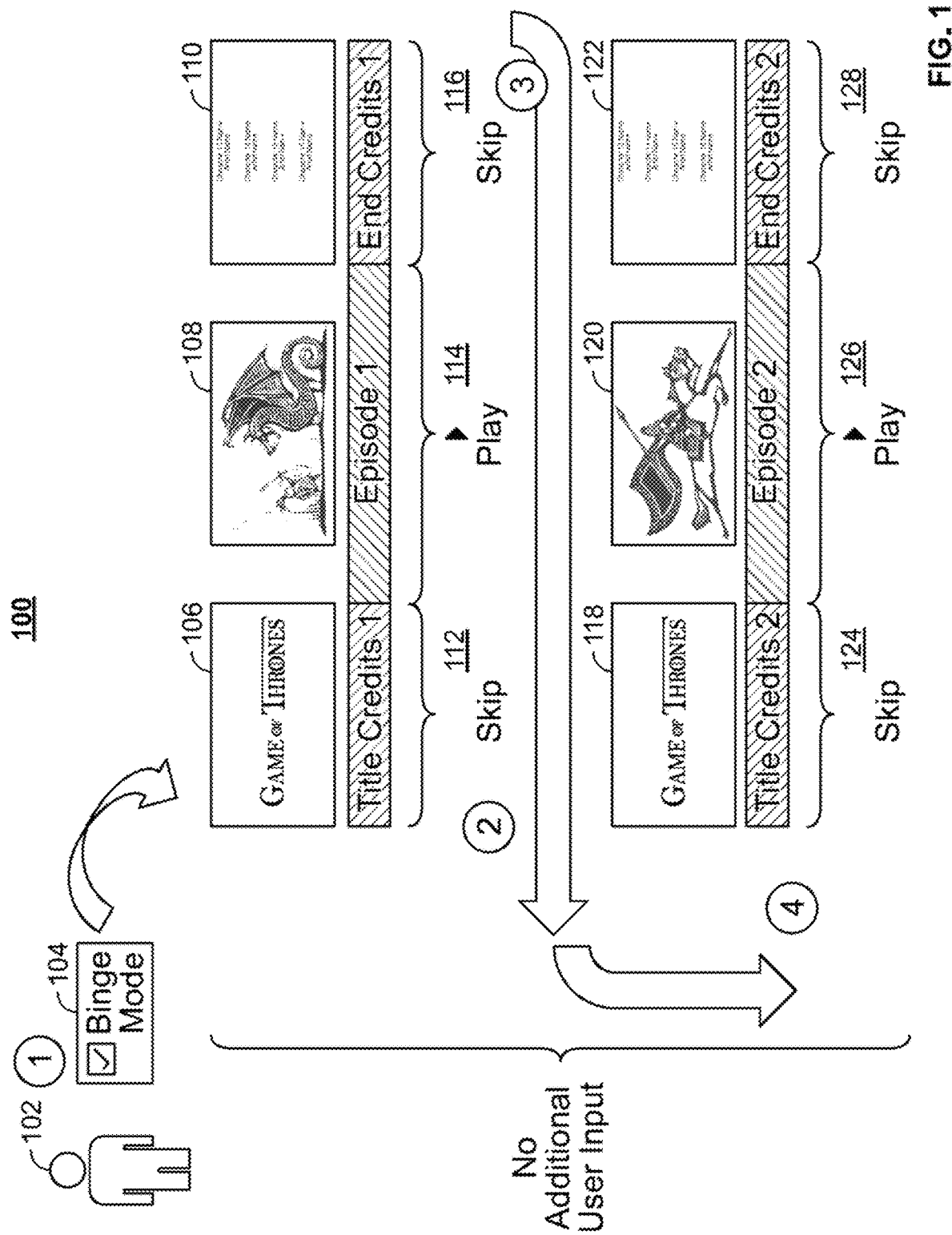
FIG. 1 depicts an illustrative scenario for a media delivery application providing media content in a continuous watching mode, in accordance with some embodiments of the disclosure.

FIG. 1 depicts an illustrative scenario for a media delivery application providing media content in a continuous watching mode. A continuous watching mode may refer to any mode of delivering media content (e.g., TV shows, movies, music, audio books, etc.) such that consecutive media content items (e.g., episodes of a TV show or tracks of an album) are delivered one after another without additional requests for content. For example, continuous watching mode may refer a remote server streaming TV show episodes to a user device (e.g., over the Internet) one after another. The term "continuous watching mode" is synonymous with the term "binge mode" and both of these terms may be used interchangeably throughout the specification and the figures.

FIG. 1 depicts user 102 requesting a delivery of content (e.g., delivery of the "Game of Thrones" show) using user interface 104 (e.g., using user interface depicted in FIG. 4, below). User interface 104 may be used to explicitly request the binge mode presentation. In some embodiments, the user interface may automatically engage in the binge mode (e.g., based on time of day).

When the request to deliver content (e.g., to stream "Game of Thrones") is received, the media delivery application may begin playing Episode 1 of the series. Episode 1 may include title credits 106, content portion 108, and end credits 110. Title credits typically include information about the show and may include an opening sequence that is common to all episodes of the show. End credits can include cast information about actors who performed in the episode. Commonly, end credits are the same or very similar for all episodes of the same show.

The media delivery application automatically skips 112 title credits 106 of Episode 1 (e.g., Episode 1 of "Game of Thrones"). In one implementation, the title credits 106 of Episode 1 are played, but all other title credits of subsequent episodes are skipped. Then, the media delivery application plays 114 content portion 108 of Episode 1 as normal. When content portion 108 concludes, the media delivery application skips 116 end credits 110 of Episode 1. Subsequently, the media delivery application immediately begins playing 126 the Episode 2 of the series (e.g., Episode 1 of "Game of Thrones"). In some embodiments, the media delivery application skips 124 title credits 118 of Episode 2. End credits 122 may also be skipped 128.

The media delivery application then begins playing 126 content portion 120 of Episode 2 without any kind of interruption. In some embodiments, the media delivery application creates an appearance of content portion 108 and content portion 120 being a single media asset. When the media delivery application concludes playing 126 content portion 120 of Episode 2, the media delivery application may skip 128 end credits 122 of Episode 2. In some embodiments, the media delivery application may then proceed to play Episode 3 (not shown) in the same manner as described above with respect to Episode 2. For example, skipping episode portions 106, 110, 118, and 122 is accomplished by identifying which frames of the episodes belong to title or end credits, and preventing generation for display of the identified frames. For example, the media delivery application may receive metadata identifying credit frames. In some embodiments, the media delivery application may compare episodes to each other to identify similar segments. Such segments can then be marked as credit segments to be skipped.

When the last frame of content portion 108 of Episode 1 is finished being generated for display, the media delivery application may immediately generate for display the first frame of content portion 120 of Episode 2. Such transition is designed to make sure that Episode 2 is presented right after Episode 1, without interruption. In some embodiments, the media delivery application may begin buffering frames of Episode 2 while Episode 1 is still playing to ensure a smooth transition. For example, thirty seconds before portion 108 finishes playing (or before another predetermined time period, e.g., one minute), the media delivery application may buffer enough frames of portion 120 of Episode 2 to ensure a smooth transitions to playing episode 2, while sections 110 and 118 are skipped.

The media delivery application may perform all of steps 112, 114, 116, 124, 126, and 128 without receiving any input from the user related to skipping through content. This allows the media delivery application to achieve the best bandwidth utilization (by automatically skipping needless portions of the episodes) while improving the user experience by not burdening the user with the need to provide more input.

Figure 2:
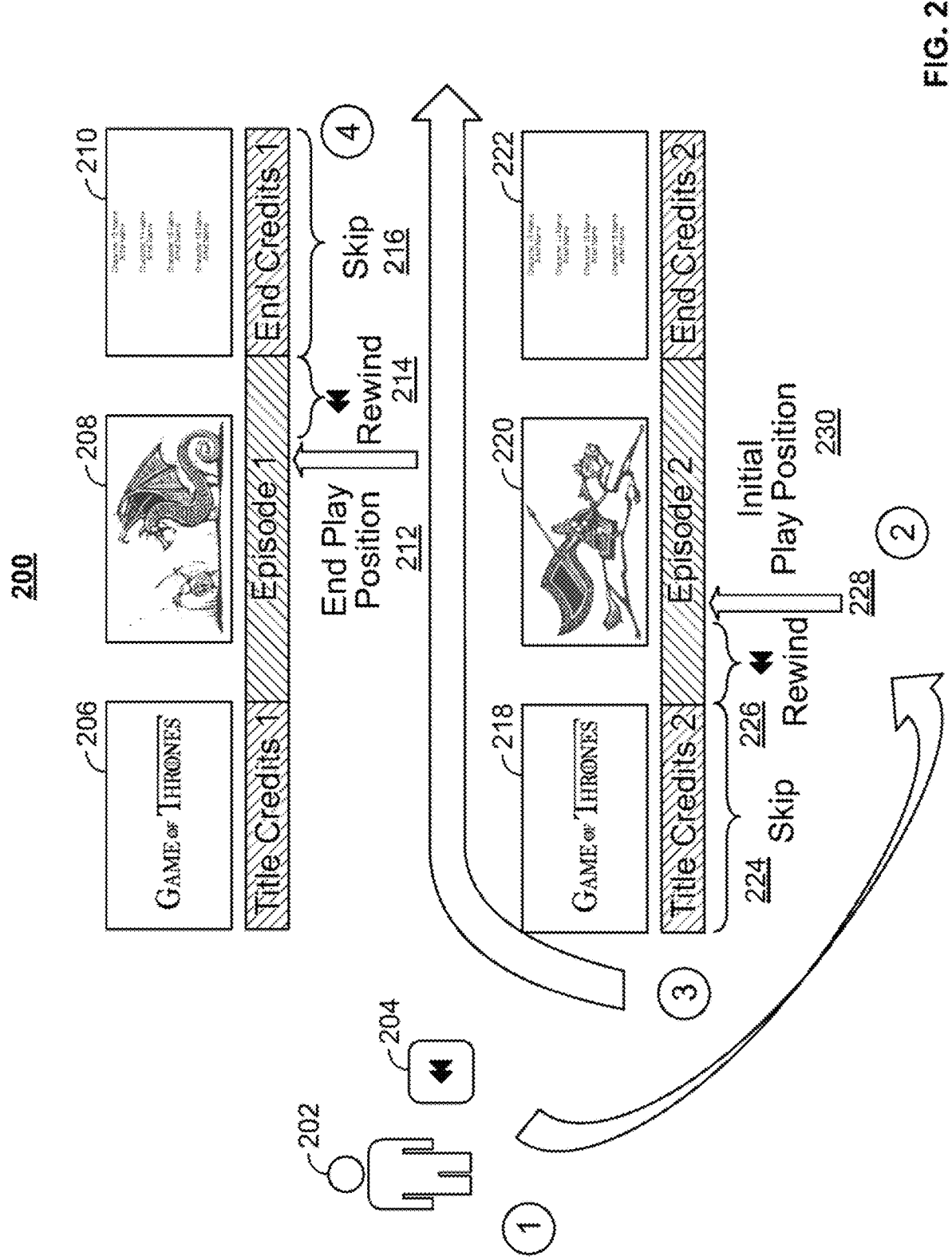
FIG. 2 depicts an illustrative scenario for a media delivery application providing rewind functionality in a continuous watching mode, in accordance with some embodiments of the disclosure.

FIG. 2 depicts an illustrative scenario for a media delivery application providing rewind functionality in a continuous watching mode. For example, the media delivery application may provide the rewind functionality for a show being played in binge mode as shown in FIG. 1.

FIG. 2 depicts user 202 (e.g., the same user as user 102 of FIG. 1) requesting a rewind using any kind of user interface 204 (e.g., using user interface depicted in FIG. 5, below). User interface 204 may, for example, include a button labeled "Rewind." In some embodiments, user 202 continues to hold the rewind button to rewind media content. Alternatively, after a single press of a rewind button, the media delivery application may perform a rewind operation until another input is received.

FIG. 2 depicts a user rewinding through two episodes of the same show (e.g., through Episodes 1 and 2 of "Game of Thrones"). Episode 1 may include title credits 206, content portion 208, and end credits 210. Episode 2 may include title credits 218, content portion 220, and end credits 222. In the shown example, user 202 requests rewind (e.g., by using user interface 204) when the media delivery application is playing back Episode 2 from initial play position 228. Initial play position 228 may be in the middle of content portion 220.

In some embodiments, in response to the rewind command, the media delivery application begins rewinding 226 Episode 2. In some embodiments, rewinding through an episode is performed by generating frames of the first episode for display in a reverse order. Additionally, some frames may be skipped during the rewind operation and/or the rate at which the frames of the first episode are generated for display may be increased.

When the rewind operation reaches title credits 218 portion of Episode 2, the media delivery application skips 224 title credits 218. At this point, the media delivery application smoothly continues to rewind through Episode 1 of the show. For example, the media delivery application may skip 216 end credits 210 and smoothly begin to rewind 216 content portions 208 of Episode 1. In some embodiments, the user may request an end of rewind operation when the rewind operation reaches position 212. In some embodiments, the media delivery application may then begin to play Episode 1 from position 212. In some embodiments, the rewinding is performed as if portion 208 and portion 220 were one media content item.

End credits and title credits are identified as described with respect to FIG. 1. When frames of the end credits and title credits are identified, the media delivery application may refrain from generation for display of the identified frames during the rewind operation. For example, when the first frame of the portion 220 is shown in the rewind mode, the media delivery application may immediately show the last frame of portion 208. In some embodiments, the media delivery application may begin buffering frames of Episode 1 while Episode 2 is still being rewound to ensure a smooth transition. For example, five seconds before portion 220 is finished being rewound (or before another predetermined time period, e.g., 10 seconds), the media delivery application may buffer enough frames of portion 208 of Episode 1 to ensure a smooth transition to rewinding Episode 1, while sections 218 and 210 are skipped.

The media delivery application may perform all of steps 226, 224, 216, and 214 without receiving any input from the user related to skipping through content (other than the initial rewind command). This allows the media delivery application to achieve the best bandwidth utilization (by automatically skipping needless portions of the episodes) while improving the user experience by not burdening the user with the need to provide more input or to request different episodes.

Figure 3:
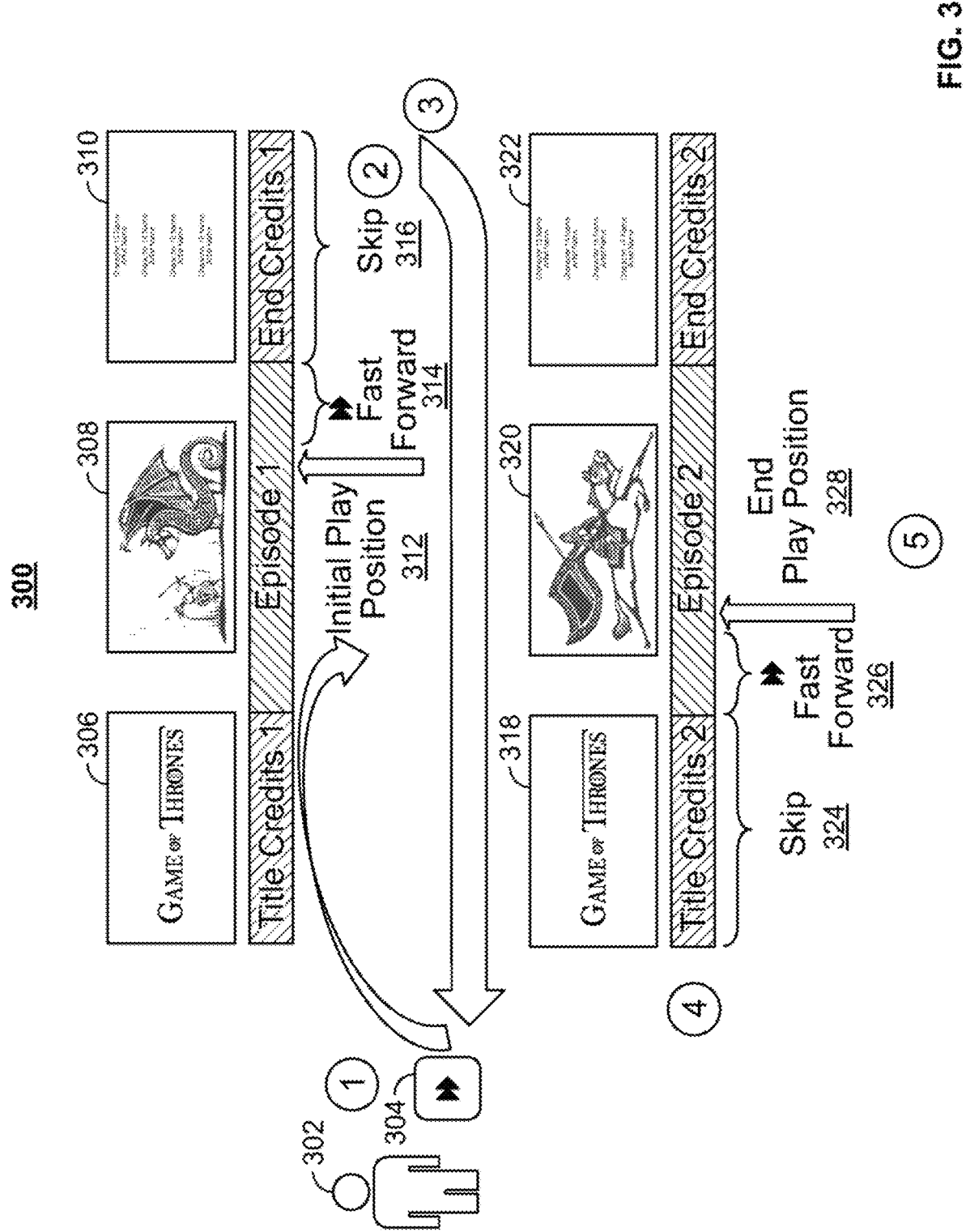
FIG. 3 depicts an illustrative scenario for a media delivery application providing fast-forward functionality in a continuous watching mode, in accordance with some embodiments of the disclosure.

FIG. 3 depicts an illustrative scenario for a media delivery application providing fast-forward functionality in a continuous watching mode. For example, the media delivery application may provide the fast-forward functionality for a show being played in binge mode as shown in FIG. 1.

FIG. 3 depicts user 302 (e.g., the same user as user 102 of FIG. 1) requesting a fast-forward operation using any kind of user interface 304 (e.g., using user interface depicted in FIG. 5, below). User interface 304 may, for example, include a button labeled "Fast-forward." In some embodiments, user 302 continues to hold the fast-forward button to fast-forward media content. Alternatively, after a single press of a fast-forward button, the media delivery application may perform a fast-forward operation until another input is received.

FIG. 3 depicts a user rewinding through two episodes of the same show (e.g., through Episodes 1 and 2 of "Game of Thrones"). Episode 1 may include title credits 306, content portion, 308, and end credits 310. Episode 2 may include title credits 318, content portion 320, and end credits 322. In the shown example, user 302 requests fast-forward (e.g., by using user interface 304) when the media delivery application is playing back Episode 1 from initial play position 312. Initial play position 312 may be in the middle of content portion 308.

In some embodiments, in response to the fast-forward command, the media delivery application begins fast-forwarding 314 Episode 1. In some embodiments, fast-forwarding through an episode is performed by generating frames of the first episode for display in a forward direction while some frames may be skipped during the fast-forward operation, and/or the rate at which the frames of an episode are generated for display may be increased.

When the media delivery application reaches end credits 310 portion of Episode 1, the media delivery application skips 316 title credits 310. At this point, the media delivery application smoothly continues to fast-forward through Episode 2 of the show. For example, the media delivery application may skip 324 title credits 318 and smoothly begin to fast-forward 326 content portion 320 of episode 2. In some embodiments, the user may request an end of fast-forward operation when the fast-forward operation reaches position 328. In some embodiments, the media delivery application may then begin to play Episode 2 from position 328. In some embodiments, the fast-forward is performed as if portion 308 and portions 320 were one media content item.

In some embodiments, end credits and title credits are identified as described with respect to FIG. 1. When frames of the end credits and title credits are identified, the media delivery application may refrain from generation for display the identified frames during the fast-forward operation. For example, when the last frame of the portion 308 is shown in the fast-forward mode, the media delivery application may immediately show the first frame of portion 320. In some embodiments, the media delivery application may begin buffering frames of Episode 2 while Episode 1 is still being fast-forwarded to ensure a smooth transition. For example, five seconds before portion 308 is finished being the fast-forwarded (or before another predetermined time period, e.g., 10 seconds), the media delivery application may buffer enough frames of portion 320 of Episode 2 to ensure a smooth transition to the fast-forward Episode 2, while sections 310 and 318 are skipped.

In some embodiments, the media delivery application may perform all of steps 314, 316, 324, and 326 without receiving any input from the user related to skipping through content (other than the initial fast-forward command). This allows the media delivery application to achieve the best bandwidth utilization (by automatically skipping needless portions of the episodes) while improving the user experience by not burdening the user with the need to provide more input or to separately request more episodes.

Figure 4:
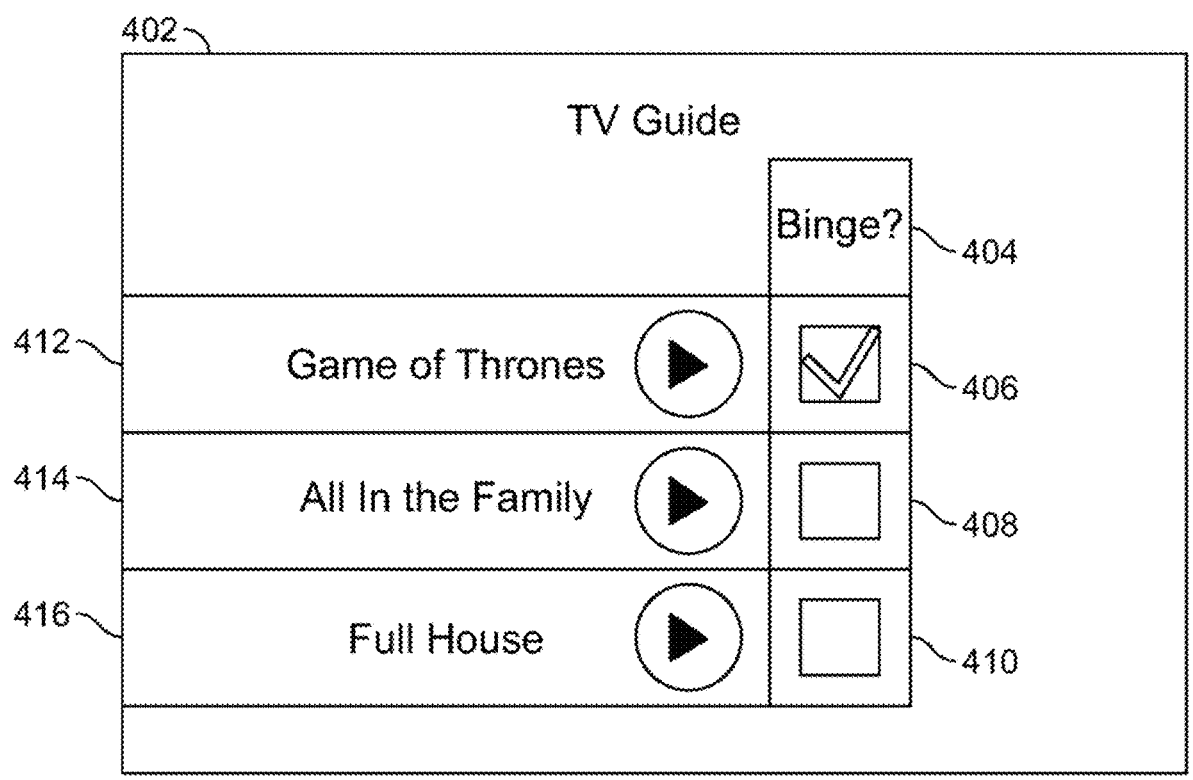
FIG. 4 depicts an illustrative user interface provided by the media delivery application, in accordance with some embodiments of the disclosure.

FIG. 4 depicts an illustrative user interface provided by the media delivery application, in accordance with some embodiments of the disclosure. FIG. 4 depicts a display 400 which is used to generate for display a user interface for requesting content in binge mode. For example, display 400 may depict TV guide 402 of a cable system or a user interface of an OTT (over-the-top) service provider.

In some embodiments, display 400 depicts a list of several shows 412, 414, and 416 (each one containing multiple episodes). Each listing may include a user interface element (e.g., a play button) that is used to request playing of that show. For example, the user may request playback of show "Game of Thrones" by pressing a play button next to the text "Game of Thrones." In some embodiments, display 400 may depict binge mode selection interface 404. For example, the binge mode selection interface may include checkboxes 406, 408, and 410 for each of the listed shows 412, 414, and 416. If the user checks the box 406, the media delivery application may always play the associated show (e.g., "Game of Thrones") in binge mode from that point on. For example, if the user clicks the play button next to listing 412, the media delivery application may begin playing episodes of the Game of Thrones show in a continuous watching mode as described in relation to FIG. 1.

Figure 5:
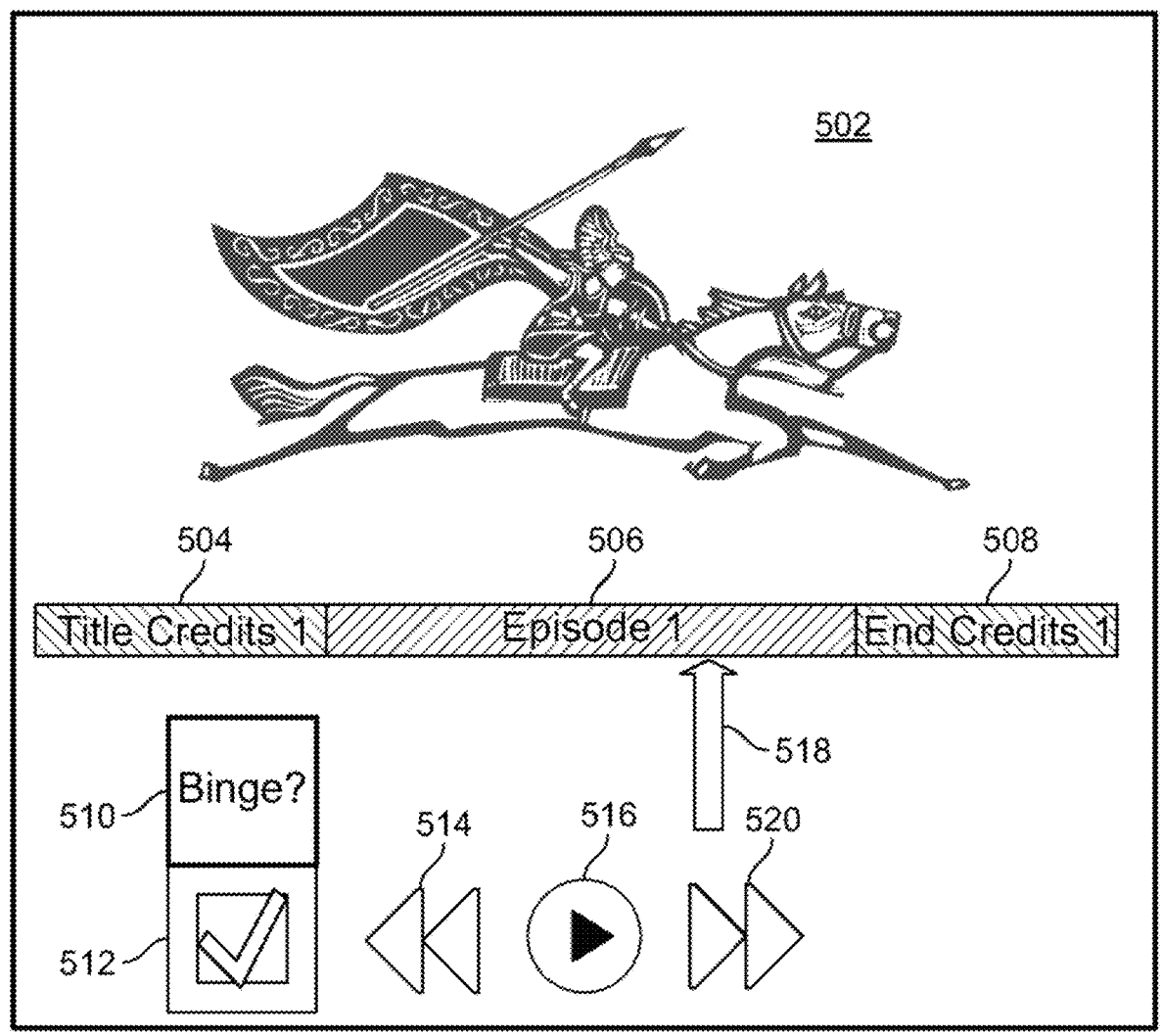
FIG. 5 depicts another illustrative user interface provided by the media delivery application, in accordance with some embodiments of the disclosure.

FIG. 5 depicts another illustrative user interface provided by the media delivery application, in accordance with some embodiments of the disclosure. FIG. 5 shows an exemplary user interface provided by the media delivery application while media content is being played on screen 500. For example, the media delivery application may be generating scenes 502 of "Game of Thrones" on screen 500.

During the presentation of scene 502, the media delivery application may also provide user interface that includes a progress bar (that may include segments 504, 506, and 508). The media delivery application may display progress indicator 518 which shows the current play position. For example, progress indicator 518 may be in the middle of segment 506 while the scene 502 is generated for display.

In some embodiments, segment 504 is a title credits portion and segment 508 is an end credits portion. The user interface may include play button 516, rewind button 514, and fast-forward button 520. The user interface may also include binge mode toggle 510, which may be checked 512 or unchecked (not shown). If binge mode toggle 510, is checked, the media delivery application may operate in a continuous watching mode as described with regards to FIG. 1. Otherwise, the media delivery application may operate in normal playing mode.

In some embodiments, when binge mode toggle 510 is checked portions 504 and 508 may be no longer displayed as part of the progress bar. In one implementation, when binge mode toggle 510 is checked the progress bar may be modified to show several content portions of episodes merged together (e.g., as shown in elements 620, 622, and 624 of FIG. 6) to form one virtual content. When binge mode toggle 510 is checked, the media delivery application may completely skip portions 504 and 508 during play operation caused by a press of button 516, during rewind operation caused by press of a button 514, and during fast-forward operation caused by press of button 520.

Figure 6:
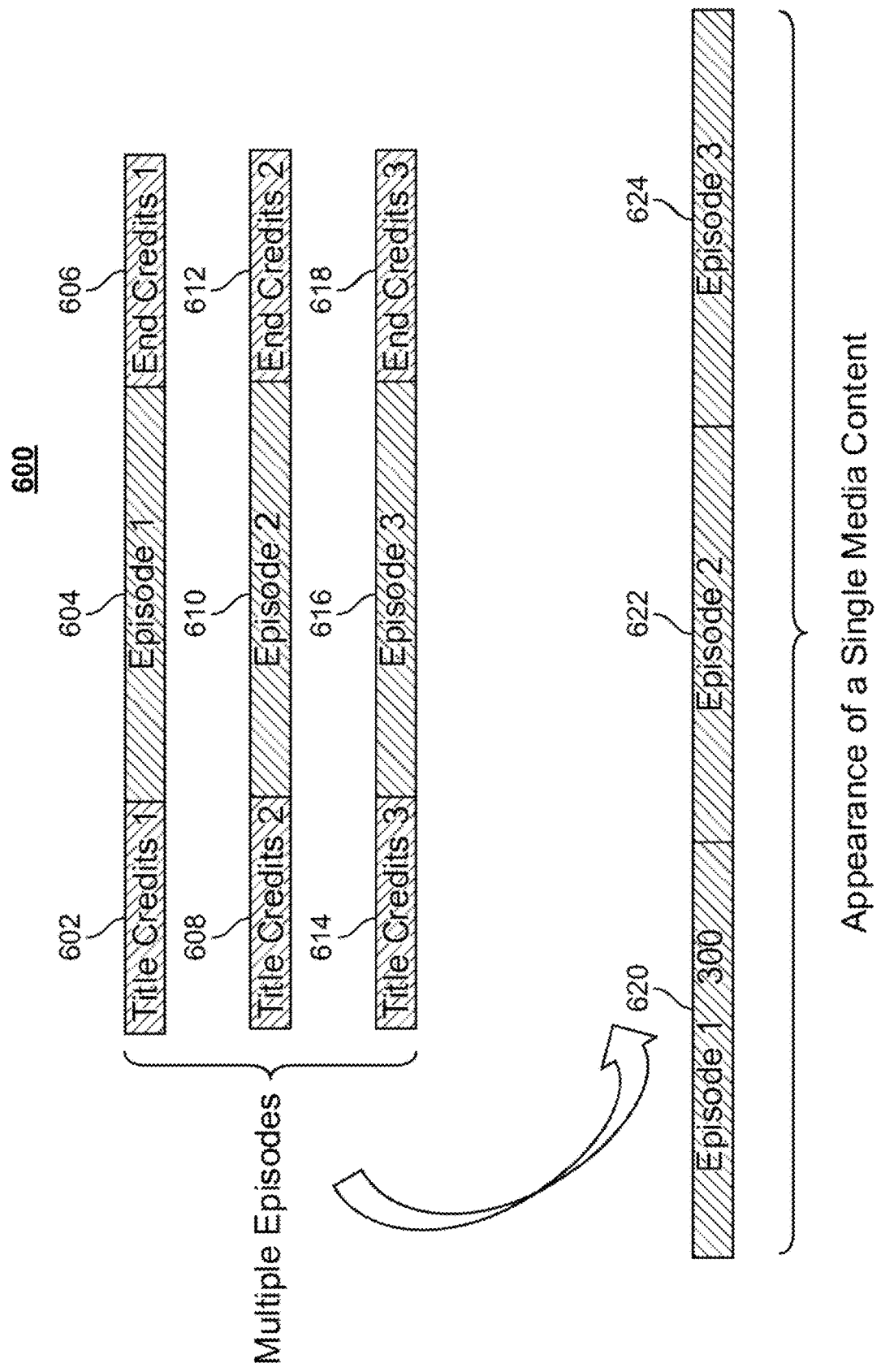
FIG. 6 depicts another illustrative scenario for a media delivery application providing media content in a continuous watching mode, in accordance with some embodiments of the disclosure.

FIG. 6 depicts another illustrative scenario for a media delivery application providing media content in a continuous watching mode, in accordance with some embodiments of the disclosure. In some embodiments, the media delivery application may receive a request to play a show that includes three episodes (Episode 1, Episode 2, and Episode 3) in a binge mode. Episode 1 may include title credits 602, content portion 604, and end credits 606. Episode 2 may include title credits 608, content portion 610, and end credits 612. Episode 3 may include title credits 614, content portion 616, and end credits 618.

In response to this request, the media delivery application may play the content portions of the episodes 620, 622, and 624 as if they are a single virtual media item. For example, first frame of portion 622 may be spliced right after the last frame of portion 620. Additionally, first frame of portion 624 may be spliced right after the last frame of portion 622. In this way the episodes are played smoothly without interruption by any of credits portions 602, 606, 608, 612, 614, and 618. Further, during any rewind or fast-forward operation, the media delivery application will smoothly transition between content portions 620, 622, and 624. For example, when portion 622 is done rewinding, the media delivery application may begin rewinding portion 620 without interruption. In another example, when portion 622 is done being fast-forwarded, the media delivery application may begin rewinding portion 624 without interruption.

Figure 7:
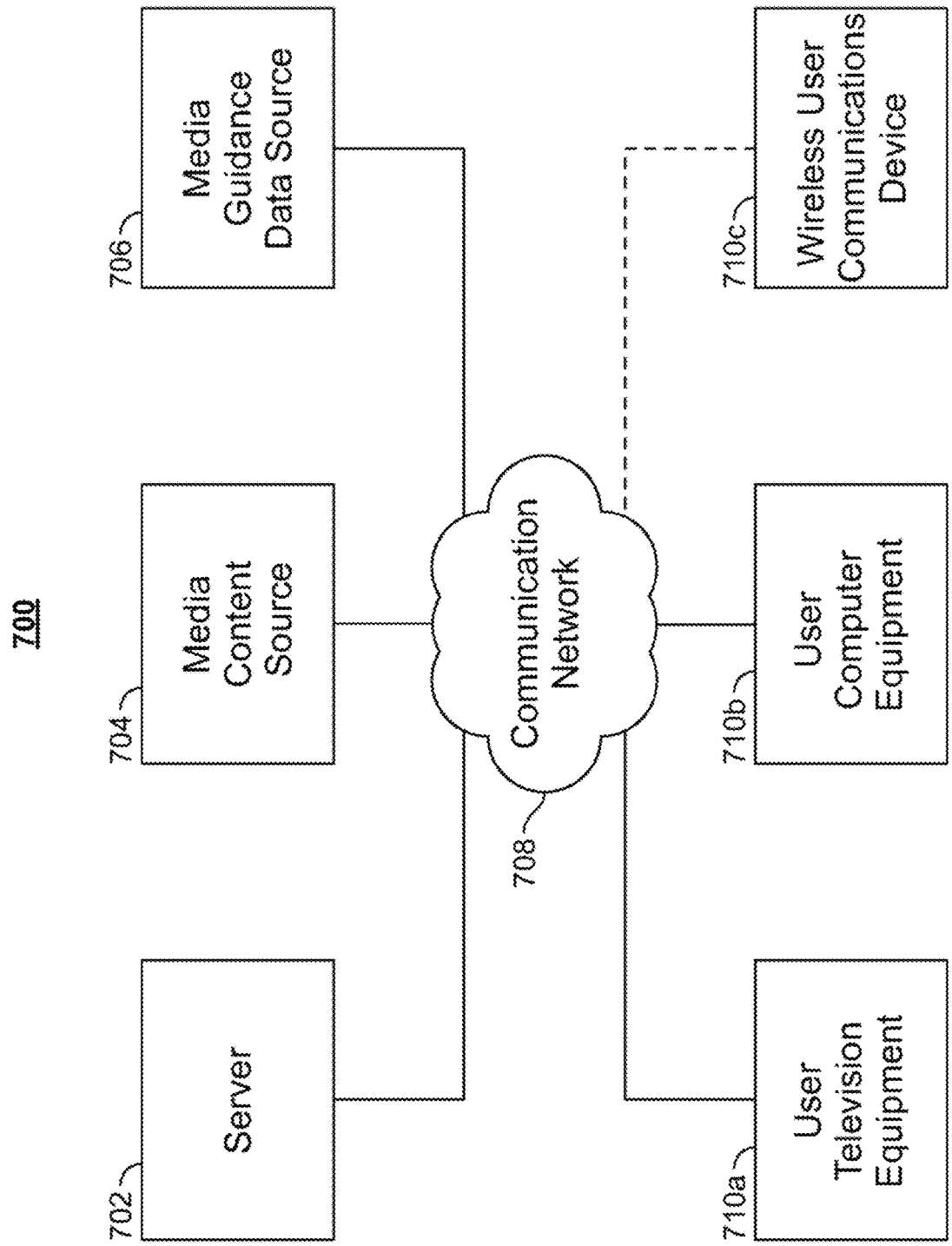
FIG. 7 shows an illustrative block diagram of a system hosting the media delivery application, in accordance with some embodiments of the disclosure.

FIG. 7 shows an illustrative block diagram of a system 700 for displaying content based on event monitoring, in accordance with some embodiments of the disclosure. In various aspects, system 700 includes one or more of server 702, media content source 704, media guidance data source 706, communication network 708, and one or more computing devices 710, such as user television equipment 710a (e.g., a set-top box), user computer equipment 710b (e.g., a laptop), and/or wireless user communications device 710c (e.g., a smartphone device).

Although FIG. 7 shows one of each component, in various examples, system 700 may include fewer than the illustrated components and/or multiples of one or more illustrated components. Communication network 708 may be any type of communication network, such as the Internet, a mobile phone network, mobile voice or data network (e.g., a 4G or LTE network), cable network, public switched telephone network, or any combination of two or more of such communication networks. Communication network 708 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 708 communicatively couples various components of system 700 to one another. For instance, server 702 may be communicatively coupled to media content source 704, media guidance data source 706, and/or computing device 710 via communication network 708.

In some examples, media content source 704 and media guidance data source 706 may be integrated as one device. Media content source 704 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 704 may be the originator of content (e.g., a television broadcaster, a Webcast provider, etc.) or may not be the originator of content (e.g., an on-demand content provider, an Internet provider of content of broadcast programs for downloading, etc.). Media content source 704 may include cable sources, satellite providers, on-demand providers, Internet providers, over-the-top content providers, or other providers of content. Media content source 704 may also include a remote media server used to store different types of content (e.g., including video content selected by a user) in a location remote from computing device 710. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 704 and media guidance data source 706 may provide content and/or media guidance data to computing device 710 and/or server 702 using any suitable approach. In some embodiments, media guidance data source 706 may provide a stand-alone interactive television program guide that receives program guide data via a data feed (e.g., a continuous feed or trickle feed). In some examples, media guidance data source 706 may provide program schedule data and other guidance data to computing device 710 on a television channel sideband, using an in-band digital signal, an out-of-band digital signal, or any other suitable data transmission technique.

As described in further detail below, server 702 manages the communication of a live content stream (e.g., a live sporting event broadcast, a live news broadcast, or the like)

and recorded streams from media content source 704 to computing device 710 via communication network 708. For instance, in some embodiments, content from media content source 704 and/or guidance data from media guidance data source 706 may be provided to computing device 710 using a client/server approach. In such examples, computing device 710 may pull content and/or media guidance data from server 702 and/or server 702 may push content and/or media guidance data to computing device 710. In some embodiments, a client application residing on computing device 710 may initiate sessions with server 702, media content source 704, and/or media guidance data source 706 to obtain content and/or guidance data when needed, e.g., when the guidance data is out of date or when computing device 710 receives a request from the user to receive content or guidance data. In various aspects, server 702 may also be configured to detect events within the live content stream and, based on the detected events, control the display of content and/or navigation menu options via computing device 710. Additionally, although FIG. 7 shows media content source 704 and media guidance data source 706 as separate from server 702, in some embodiments, media content source 704 and/or media guidance data source 706 may be integrated as one device with server 702.

Content and/or media guidance data delivered to computing device 710 may be over-the-top (OTT) content. OTT content delivery allows Internet-enabled user devices, such as computing device 710, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOU-TUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 710.

Figure 8:
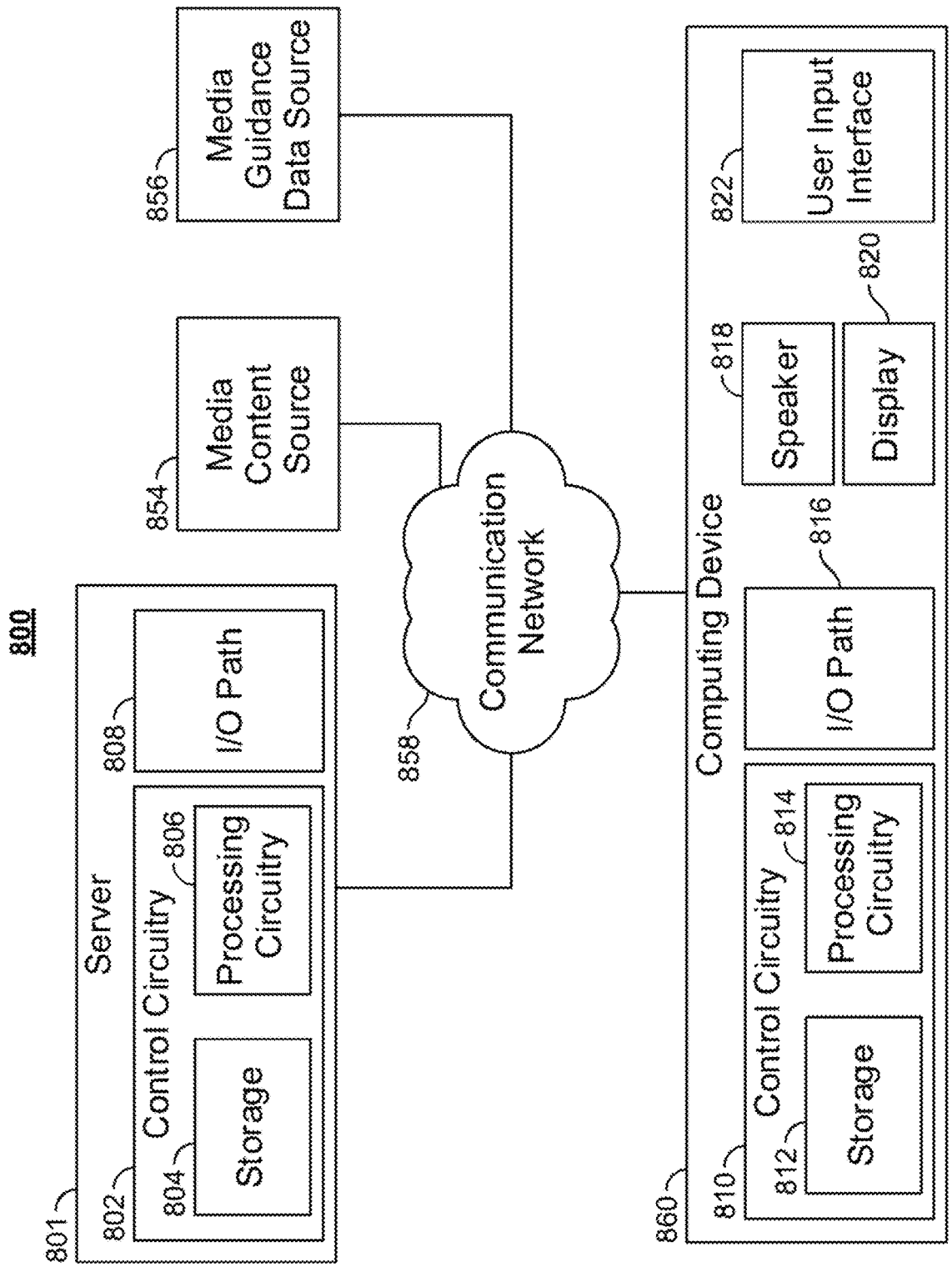
FIG. 8 is an illustrative block diagram showing additional details of a system hosting the media delivery application, in accordance with some embodiments of the disclosure.

FIG. 8 is an illustrative block diagram showing additional details of the system 800 (which may be the same as system 700 of FIG. 7), in accordance with some embodiments of the disclosure. In particular, server 801 (e.g., the same server as server 702) includes control circuitry 802 and I/O path 808, and control circuitry 802 includes storage 804 and processing circuitry 806. Computing device 860 (e.g., one or more of devices 710a, 710, and 710c) includes control circuitry 810, I/O path 816, speaker 818, display 820, and user input interface 822. Control circuitry 810 includes storage 812 and processing circuitry 814. Control circuitry 802 and/or 810 may be based on any suitable processing circuitry such as processing circuitry 806 and/or 814. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 804, storage 812, and/or storages of other components of system 800 (e.g., storages of media content source 854, media guidance data source 856, and/or the like) may be an electronic storage device. In some embodiments, media content source 854 may be the same as media content source 704. In some embodiments, media guidance data source 856 may be the same as media content source 706. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 804, storage 812, and/or storages of other components of system 800 may be used to store various types of content, media guidance data, and or other types of data. Non-volatile memory may also be used (e.g., to launch a boot-up routine and other instructions). Cloud-based storage may be used to supplement storages 804, 812 or instead of storages 804, 812. In some embodiments, control circuitry 802 and/or 810 executes instructions for a media delivery application stored in memory (e.g., storage 804 and/or 812). Specifically, control circuitry 802 and/or 810 may be instructed by the media delivery application to perform the functions discussed herein. In some implementations, any action performed by control circuitry 802 and/or 810 may be based on instructions received from the media delivery application. For example, the media delivery application may be implemented as software or a set of executable instructions that may be stored in storage 804 and/or 812 and executed by control circuitry 802 and/or 810. In some embodiments, the media delivery application may be a client/server media delivery application where only a client media delivery application resides on computing device 860, and a server media delivery application resides on server 801.

The media delivery application may be implemented using any suitable architecture. For example, it may be a stand-alone media delivery application wholly implemented on computing device 860. In such an approach, instructions for the media delivery application are stored locally (e.g., in storage 812), and data for use by the media delivery application is downloaded on a periodic basis (e.g., from an out-of-band feed, from an Internet resource, or using another suitable approach). Control circuitry 814 may retrieve instructions for the media delivery application from storage 812 and process the instructions to perform the functionality described herein. Based on the processed instructions, control circuitry 814 may determine what action to perform when input is received from user input interface 822.

In client/server-based embodiments, control circuitry 810 may include communication circuitry suitable for communicating with a media delivery application server (e.g., server 801) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 858). In some embodiments, communication network 858 may be the same as network 708. In another example of a client/server-based application, control circuitry 810 runs a web browser that interprets web pages provided by a remote server (e.g., server 801). For example, the remote server may store the instructions for the application in a storage device. The remote server may process the stored instructions using circuitry (e.g., control circuitry 802) and generate the displays discussed above and below. Computing device 860 may receive the displays generated by the remote server and may display the content of the displays locally via display 820. This way, the processing of the instructions is performed remotely (e.g., by server 801) while the resulting displays, such as the display windows described elsewhere herein, are provided locally on computing device 860. Computing device 860 may receive inputs from the user via input interface 822 and transmit those inputs to the remote server for processing and generating the corresponding displays.

A user may send instructions to control circuitry 802 and/or 810 using user input interface 822. User input interface 822 may be any suitable user interface, such as a remote control, trackball, keypad, keyboard, touchscreen, touchpad, stylus input, joystick, voice recognition interface, or other user input interfaces. User input interface 822 may be integrated with or combined with display 820, which may be a monitor, television, liquid crystal display (LCD), electronic ink display, or any other equipment suitable for displaying visual images.

Server 801 and computing device 860 may receive content and data via input/output (hereinafter "I/O") path 808 and 816, respectively. For instance, I/O path 816 may include circuitry that includes one or more of communication port configured to receive a live content stream from server 801 and/or media content source 854 via a communication network 858. Storage 812 may be configured to buffer the received live content stream for playback, and display 820 may be configured to present the buffered content, navigation options, alerts, and/or the like via a primary display window and/or a secondary display window. I/O paths 808, 816 may provide content (e.g., a live stream of content, broadcast programming, on-demand programming, Internet content, content available over a local area network (LAN) or wide area network (WAN), and/or other content) and data to control circuitry 802, 810. Control circuitry 802, 810 may be used to send and receive commands, requests, and other suitable data using I/O paths 808, 816. I/O paths 808, 816 may connect control circuitry 802, 810 (and specifically processing circuitry 806, 814) to one or more communication paths (described below). I/O functions may be provided by one or more of these communication paths but are shown as single paths in FIG. 8 to avoid overcomplicating the drawing.

In some embodiments, storage 812 may include a buffer portion designated for buffering media streams received from server 801, or media content source 854. In some embodiments, the buffer may be a virtual designated portion of a device used for other storage. In some embodiments, the buffer may be a stand-alone device dedicated to the buffering operation of media content being played.

Figure 9:
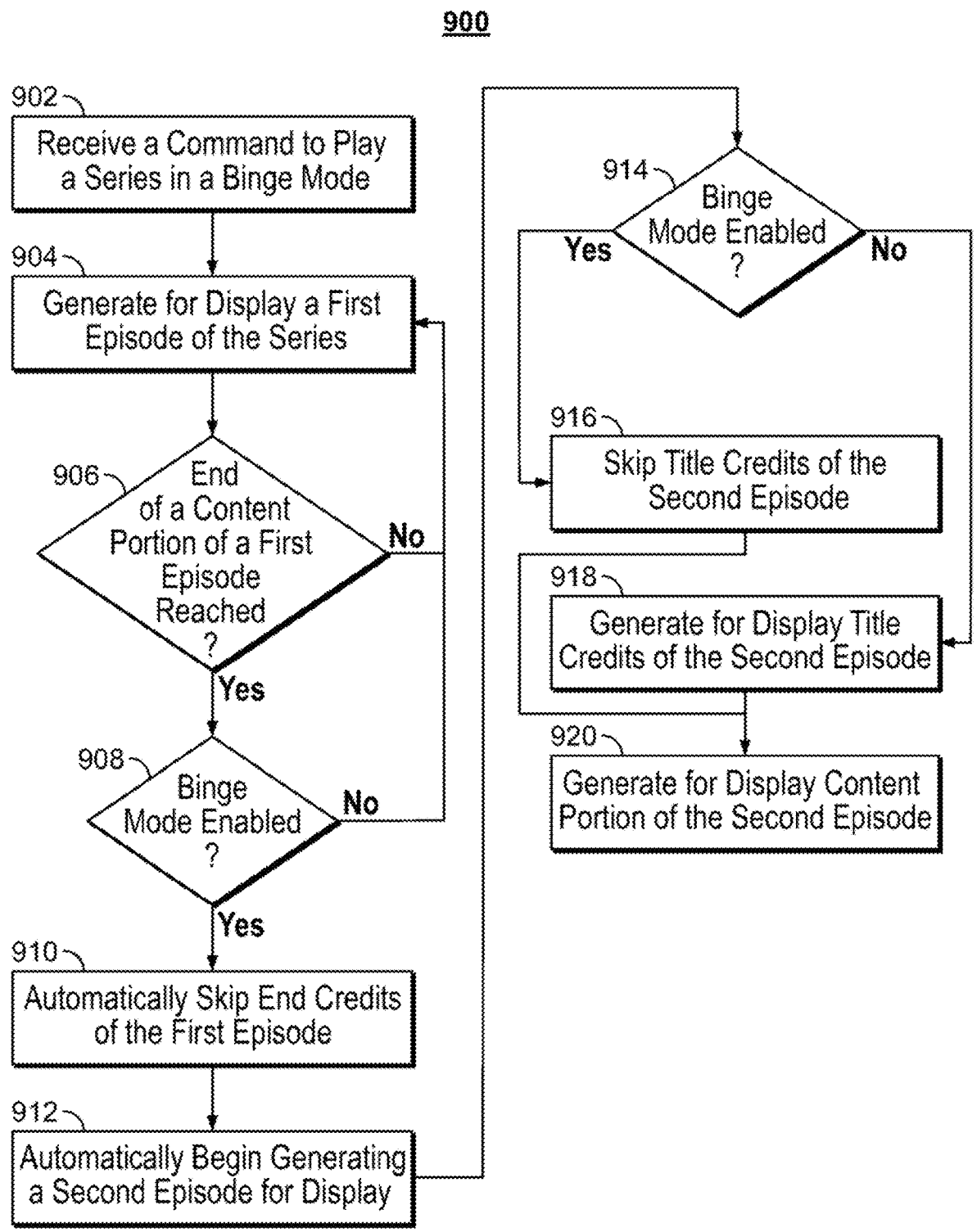
FIG. 9 depicts an illustrative flowchart of a process for providing media content in a continuous watching mode, in accordance with some embodiments of the disclosure.

Having described systems 700 and 800, reference is now made to FIG. 9, which depicts an illustrative flowchart of process 900 for providing media content in a continuous watching mode that may be implemented by using systems 700 and 800 in accordance with some embodiments of the disclosure. In various embodiments, individual steps of process 900 may be implemented by one or more components of systems 700 and 800. Although the present disclosure may describe certain steps of process 900 (and of other processes described herein) as being implemented by certain components of systems 700 and 800, this is for purposes of illustration only, and it should be understood that other components of systems 700 and 800 may implement those steps instead. For example, steps of process 900 may be executed by server 801 and/or by computing device 860 to provide a continuous watching mode.

At step 902, control circuitry 860 may receive a command to play a series in binge mode or in continuous watching mode. For example, the command may be received via user interface input 822 (e.g., as depicted by FIG. 4). For example, control circuitry 860 may receive a selection of playback request of "Game of Thrones" with additional input indicating selection of playback in the binge mode. In some embodiments, "Game of Thrones" may include multiple consecutive episodes (e.g., Episode 1, Episode 2, Episode 3 etc.)

At step 904, control circuitry 860 may begin generating for display a first episode of the series (e.g., Episode 1 of "Game of Thrones"). For example, the episode may be derived from media content source 854 (e.g., as on-demand show) or from server 801 (e.g., as OTT show delivered via network 858). In some embodiments, the control circuitry 860 may generate the first episode on display 820.

At 906, control circuitry 860 may check if Episode 1 is at an end. For example, control circuitry 860 may check if the last frame of content portion of Episode 1 was shown. If not, control circuitry 860 may proceed back to step 904. If so, control circuitry 860 may proceed to step 908. At 908, control circuitry 860 may check whether binge mode is enabled. For example, control circuitry 860 may determine whether checkbox 510 of the user interface depicted in FIG. 5 is checked. If not, control circuitry 860 may proceed back to step 904 and continue generating Episode 1 for display. For example, control circuitry 860 may continue showing end credits of Episode 1. If so, control circuitry 860 may proceed to 910.

At 910, control circuitry 860 may automatically skip end credits of the first episode. For example, credits may be skipped without any additional input requesting a skip being received from the user. For example, control circuitry 860 may avoid generating for display any frames determined to belong to end credits of the first episode.

At 912, control circuitry 860 may automatically begin generating for display a second episode of the series (e.g., Episode 2 of "Game of Thrones"). For example, control circuitry 860 may request playback of the second episode of the series from media content source 854 or from server 801 without a user input requesting playback of Episode 2. At 914, control circuitry 860 may check whether binge mode is enabled. For example, the check may be performed in the same way as it was performed in step 908. If binge mode is enabled, process 900 proceeds to step 916. Otherwise, process 900 proceeds to step 918.

At 916, control circuitry 860 may skip title credits of the second episode. For example, credits may be skipped without any additional input requesting a skip being received from the user. For example, control circuitry 860 may avoid generating for display any frames determined to belong to end credits of the first episode. At 918, control circuitry 860 may generate the title credits of Episode 2 for display, as normal.

At 920, control circuitry 860 may begin to generate for display the content portion of the second episode. For example, control circuitry 860 may generate for display frames of the second episode (e.g., stating from the first frame of the second episode) immediately after the last frame of the first episode is generated. In some embodiments, control circuitry 860 may begin buffering frames of the content portion of the second episode as the playing of the first episode is nearing the conclusion. For example, one minute before the end of Episode 1, control circuitry 860 may begin buffering (e.g., using buffer of storage 812) frames of Episode 2, by requesting such frames from one of server 801 or media content source 854.

Figure 10:
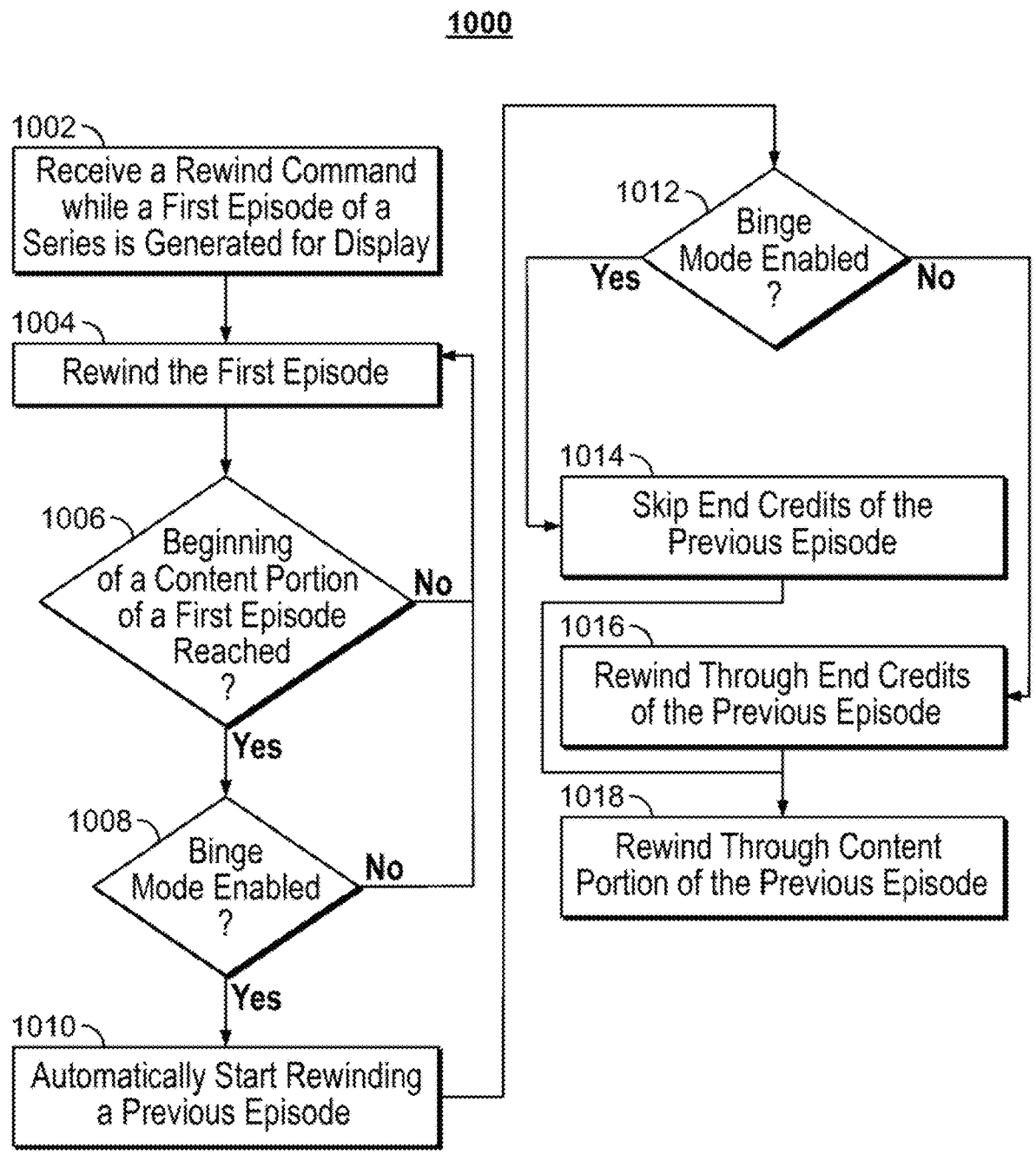
FIG. 10 depicts an illustrative flowchart of a process for providing rewind functionality for a continuous watching mode, in accordance with some embodiments of the disclosure.

Reference is now made to FIG. 10, which depicts an illustrative flowchart of process 1000 for providing rewind functionality in continuous watching mode that may be implemented by using systems 700 and 800 in accordance with some embodiments of the disclosure. In various embodiments, individual steps of process 1000 may be implemented by one or more components of systems 700 and 800. Although the present disclosure may describe certain steps of process 1000 (and of other processes described herein) as being implemented by certain components of systems 700 and 800, this is for purposes of illustration only, and it should be understood that other components of systems 700 and 800 may implement those steps instead. For example, steps of process 1000 may be executed by server 801 and/or by computing device 860 to provide a continuous watching mode.

At step 1002, control circuitry 860 may receive a command to rewind content while the first episode of a series is being displayed. For example, the command may be received via user interface input 822 (e.g., as depicted by FIG. 4). For example, control circuitry 860 may receive a selection of a rewind request while Episode 2 of "Game of Thrones" is being shown. In some embodiments, "Game of Thrones" may include multiple consecutive episodes (e.g., Episode 1, Episode 2, Episode 3, etc.).

At step 1004, control circuitry 860 may begin rewinding the first episode of the series (e.g., Episode 2 of "Game of Thrones"). For example, the episode may be being received from media content source 854 (e.g., as on-demand show) or from server 801 (e.g., as OTT show delivered via network 858). In some embodiments, the control circuitry 860 may rewind the episode by generating frames of the first episode on display 820 in reverse order at increased rate and/or with some frames being skipped.

At 1006, control circuitry 860 may check if the first episode (e.g., Episode 2) has been rewound to the beginning. For example, control circuitry 860 may check if the first frame of the content portion of Episode 2 was shown. If not, control circuitry 860 may proceed back to step 1004. If so, control circuitry 860 may proceed to step 1008. At 1008, control circuitry 860 may check whether binge mode is enabled. For example, control circuitry 860 may determine whether checkbox 510 of the user interface depicted in FIG. 5 is checked. If not, control circuitry 860 may proceed back to step 1004 and continue rewinding Episode 2. For example, control circuitry 860 may continue rewinding through title credits of Episode 1. If so, control circuitry 860 may proceed to 1010.

At 1010, control circuitry 860 may automatically start rewinding a previous episode (e.g., Episode 1 of "Game of Thrones"). For example, title credits of the first episode may be skipped without any additional input requesting such a skip. Furthermore, control circuitry 860 may begin generating for display the stream of the previous episode without receiving any additional command requesting the previous episode from the user. For example, control circuitry 860 may avoid generating for display any frames determined to belong to end credits of the first episode and begin generating for display frames of the previous episode (starting from the end) in the rewind mode. That is, control circuitry 860 may begin generating for display frames of the previous episode (received from server 801 or from media content source 854) starting from the end, in reverse direction at increased speed and/or with some frames being skipped.

At 1012, control circuitry 860 may check whether binge mode is enabled. For example, the check may be performed in the same way as it was performed in step 1008. If binge mode is enabled, process 1000 proceeds to step 1014. Otherwise, process 1000 proceeds to step 1016.

At 1014, control circuitry 860 may skip end credits of the previous episode. For example, credits may be skipped without any additional input requesting a skip being received from the user. For example, control circuitry 860 may avoid generating for display any frames determined to belong to end credits of the previous episode. At 1016, control circuitry 860 may generate the end credits of Episode 2 for display, in a rewind mode.

At 1018, control circuitry 860 may begin to rewind through the content portion of the previous episode. For example, control circuitry 860 may generate for display frames of the previous episode immediately after the first frame of the first episode is generated. In some embodiments, control circuitry 860 may begin buffering frames of the content portion of the previous episode as the rewind operation of the first episode is nearing the conclusion. For example, one minute before Episode 2 is rewound to the beginning, control circuitry 860 may begin buffering (e.g., using buffer of storage 812) frames of Episode 1, by requesting such frames from one of server 801 or media content source 854.

Figure 11:
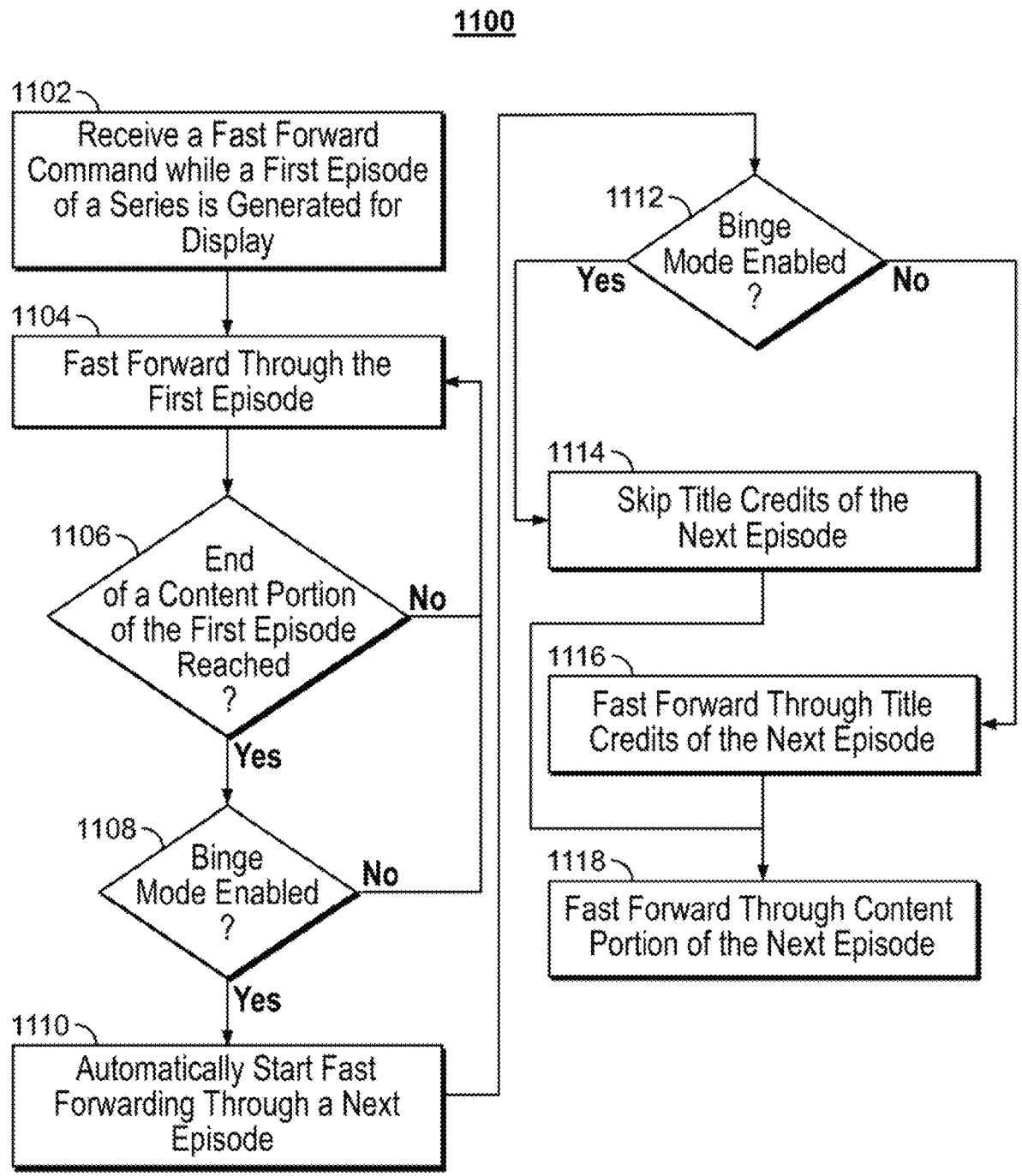
FIG. 11 depicts an illustrative flowchart of a process for providing fast-forward functionality continuous watching mode, in accordance with some embodiments of the disclosure.

Reference is now made to FIG. 11, which depicts an illustrative flowchart of process 1200 for providing fast-forward functionality, in a continuous watching mode that may be implemented by using systems 700 and 800 in accordance with some embodiments of the disclosure. In various embodiments, individual steps of process 1100 may be implemented by one or more components of systems 700 and 800. Although the present disclosure may describe certain steps of process 1100 (and of other processes described herein) as being implemented by certain components of systems 700 and 800, this is for purposes of illustration only, and it should be understood that other components of systems 700 and 800 may implement those steps instead. For example, steps of process 1100 may be executed by server 801 and/or by computing device 860 to provide a continuous watching mode.

At step 1102, control circuitry 860 may receive a command to fast-forward content while first episode of a series is being displayed. For example, the command may be received via user interface input 822 (e.g., as depicted by FIG. 4). For example, control circuitry 860 may receive a selection of a fast-forward request while Episode 1 of "Game of Thrones" is being shown. In some embodiments, "Game of Thrones" may include multiple consecutive episodes (e.g., Episode 1, Episode 2, Episode 3, etc.).

At step 1104, control circuitry 860 may begin to fast-forward first episode of the series (e.g., Episode 1 of "Game of Thrones"). For example, the episode may be being received from media content source 854 (e.g., as on-demand show) or from server 801 (e.g., as OTT show delivered via network 858). In some embodiments, the control circuitry 860 may fast-forward the episode by generating frames of the first episode on display 820 in forward order at increased rate and/or with some frames being skipped.

At 1106, control circuitry 860 may check if the first episode (e.g., Episode 1) has been fast-forwarded to the end. For example, control circuitry 860 may check if the last frame of content portion of Episode 1 was shown. If not, control circuitry 860 may proceed back to step 1104. If so, control circuitry 860 may proceed to step 1108. At 1108, control circuitry 860 may check whether binge mode is enabled. For example, control circuitry 860 may determine whether checkbox 510 of the user interface depicted in FIG. 5 is checked. If not, control circuitry 860 may proceed back to step 1104 and continue fast-forwarding Episode 1. For example, control circuitry 860 may continue fast-forwarding through the end credits of Episode 1. If so, control circuitry 860 may proceed to 1110.

At 1110, control circuitry 860 may automatically start fast-forwarding a next episode (e.g., Episode 2 of "Game of Thrones"). For example, end credits of the first episode may be skipped without any additional input requesting such a skip. Furthermore, control circuitry 860 may begin generating for display the stream of the next episode without receiving any additional command requesting the next episode from the user. For example, control circuitry 860 may avoid generating for display any frames determined to belong to end credits of the first episode and begin generating for display frames of the next episode (starting from the beginning) in the fast-forward mode. That is, control circuitry 860 may begin generating for display frames of the next episode (e.g., as received from server 801 of from media content source 854) starting from the beginning, in a forward direction at increased speed and/or with some frames being skipped.

At 1112, control circuitry 860 may check whether binge mode is enabled. For example, the check may be performed in the same way as it was performed in step 1108. If binge mode is enabled, process 1100 proceeds to step 1114. Otherwise, the process 1000 proceeds to step 1116.

At 1114, control circuitry 860 may skip title credits of the next episode. For example, credits may be skipped without any additional input requesting a skip being received from the user. For example, control circuitry 860 may avoid generating for display any frames determined to belong to title credits of the next episode. At 1016, control circuitry 860 may generate the title credits of Episode 2 for display, in fast-forward mode.

At 1118, control circuitry 860 may begin to fast-forward the content portion of the next episode. For example, control circuitry 860 may generate for display frames of the of the next episode immediately after the last frame of the first episode is generated. In some embodiments, control circuitry 860 may begin buffering frames of the content portion of the next episode as the fast-forward operation of the first episode is nearing the conclusion. For example, one minute before Episode 2 is fast-forwarded to its end, control circuitry 860 may begin buffering (e.g., using buffer of storage 812) frames of Episode 2, by requesting such frames from one of server 801 or media content source 854.

Figure 12:
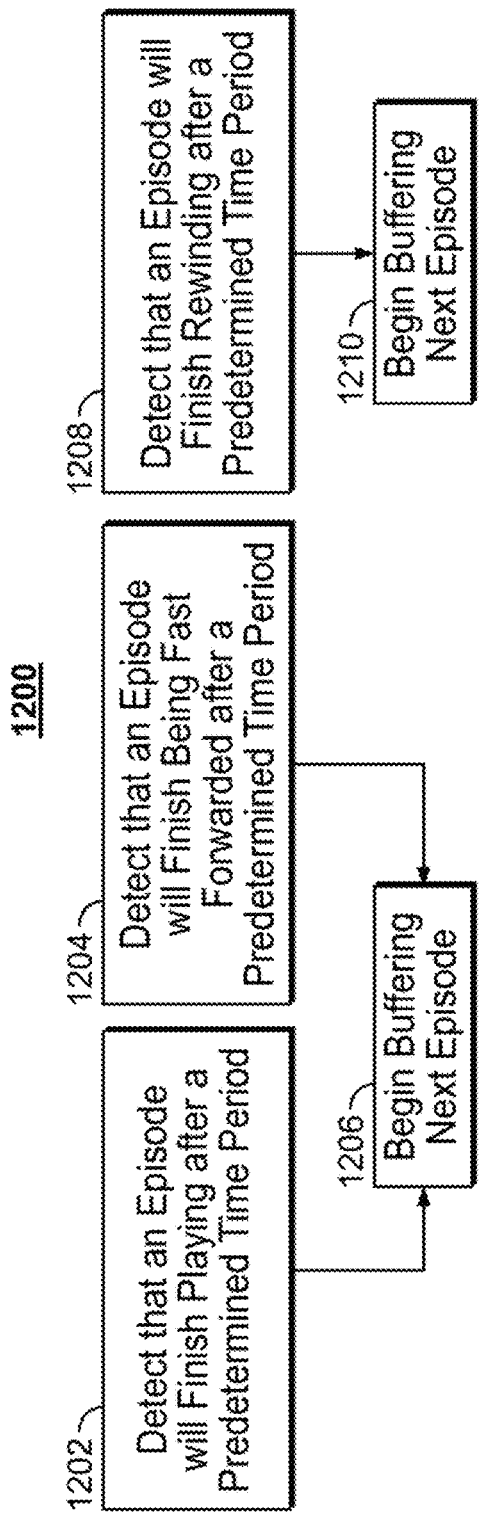
FIG. 12 depicts an illustrative flowchart of a process for buffering of episodes of a show, in accordance with some embodiments of the disclosure.

Reference is now made to FIG. 12, which depicts an illustrative flowchart of process 1200 for a process for buffering of episodes of a show that may be implemented by using systems 700 and 800 in accordance with some embodiments of the disclosure. In various embodiments, individual steps of process 1200 may be implemented by one or more components of systems 700 and 800. Although the present disclosure may describe certain steps of process 1200 (and of other processes described herein) as being implemented by certain components of systems 700 and 800, this is for purposes of illustration only, and it should be understood that other components of systems 700 and 800 may implement those steps instead. For example, steps of process 1200 may be executed by server 801 and/or by computing device 860 to provide a continuous watching mode.

In some embodiments, steps of process 1200 may be performed as part of one or more of processes 900, 1000, 1100. For example, control circuitry 860 may start buffering an episode other than the one that is currently being played based on the steps provided by process 1200.

At 1202, control circuitry 860 may detect that an episode that is currently being played (e.g., as part of step 904) will finish playing before a predetermined time period (e.g., before 1 minute or before 30 seconds). The predetermines time period may be static or dynamically calculated (e.g., based on latency of network 856). When such a detection is made, control circuitry 860 may proceed to step 1206.

Similarly, at 1204, control circuitry 860 may detect that an episode that is currently being fast-forwarded (e.g., as part of step 1204) will finish being fast-forwarded before a predetermined time period (e.g., before one minute or before 30 seconds). The predetermined time period may be static or dynamically calculated (e.g., based on latency of network 856). When such a detection is made, control circuitry 860 may proceed to step 1206.

At 1206, control circuitry 860 may begin buffering frames of an episode that follows an episode that was being generated for display at step 1202 or 1204. For example, control circuitry 860 may begin requesting frames of the next episodes from one of server 801 or media content source 854, and place the frames in the buffer of storage 812. When the next episode is ready to be played or be fast-forwarded through, control circuitry 860 may use the buffer to generate for display the frames of the next episode, while a new connection to server 801 or media content source 854 is being established. The buffer will then be replenished from server 801 or media content source 854 as the next episode is played.

At 1208, control circuitry 860 may detect that an episode that is currently being rewound (e.g., as part of step 1004) will finish being rewound before a predetermined time period (e.g., before one minute or before 30 seconds). The predetermined time period may be static or dynamically calculated (e.g., based on latency of network 856). When such a detection is made, control circuitry 860 may proceed to step 1210.

At 1210, control circuitry 860 may begin buffering frames of an episode that precedes an episode that was being generated for display at steps 1202 or 1204. For example, control circuitry 860 may begin requesting frames of the previous episode from one of server 801 or media content source 854, and place the frames in buffer of storage 812. When the previous episode is ready to be played or be rewound through, control circuitry 860 may use the buffer to generate for display the frames of the previous episode, while a new connection to server 801 or media content source 854 is being established. The buffer will then be replenished from server 801 or media content source 854 as the previous episode is played or rewound.

Figure 13:
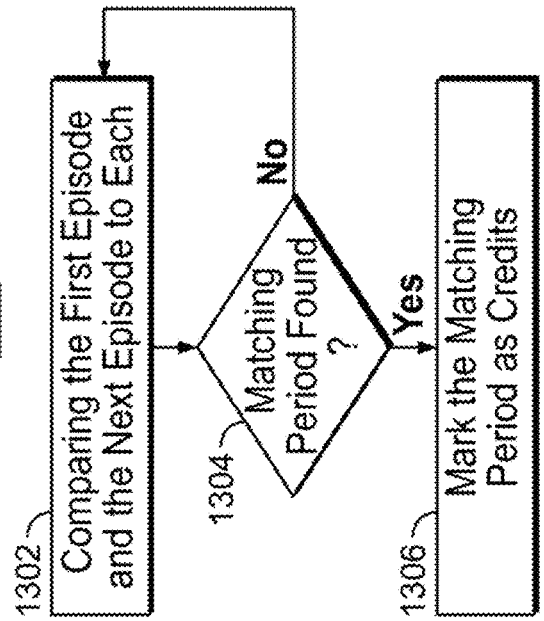
FIG. 13 depicts an illustrative flowchart of a process for identifying titles portions of an episode, in accordance with some embodiments of the disclosure.

Reference is now made to FIG. 13, which depicts an illustrative flowchart of process 1300 for a process of identifying titles portions of an episode that may be implemented by using systems 700 and 800 in accordance with some embodiments of the disclosure. In various embodiments, individual steps of process 1300 may be implemented by one or more components of systems 700 and 800. Although the present disclosure may describe certain steps of process 1300 (and of other processes described herein) as being implemented by certain components of systems 700 and 800, this is for purposes of illustration only, and it should be understood that other components of systems 700 and 800 may implement those steps instead. For example, steps of process 1300 may be executed by server 801 and/or by computing device 860 to provide a continuous watching mode. In some embodiments, steps of process 1300 may be performed as part of one or more of processes 900, 1000, or 1100. For example, control circuitry 860 may use process 1300 to determine which parts of an episode are title credits or end credits (e.g., so that such portions may be skipped).

At 1302, control circuitry 860 may compare a first episode to a second episode. For example, video frames of Episode 1 of "Games of Thrones" to Episode 2 of "Games of Thrones." For example, image signatures (e.g., Fourier Transform Frequency decompositions) of the frames of the first episode may be compared to image signatures of the second episode. At 1304, control circuitry 860 may check if a portion of the first episode that has image signatures that match image signatures of a portion of the second episode has been identified in step 1302. If not, process 1300 may continue comparisons at step 1302. If a match is found, process 1300 proceeds to 1306.

At 1306, control circuitry 860 may mark matching periods of both the first episode and the second episode as "credits." If the matching portion is in beginning of the episode, it may be marked as "title credits." If the matching portion is near the end of the episode, it may be marked as "end credits."

Alternatively to process 1300, control circuitry 860 may determine which frames of each episode belong to title credits or to end credits by consulting metadata of the episode. For example, metadata (e.g., provided by server 801 or by media guidance data source 856) may include a listing of frames that belong to credits sections.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing media content for continuous watching, the method comprising:
    receiving a command to play a series in a continuous watching mode, wherein the series comprises a plurality of sequential episodes; and
    in response to receiving the command to play the series in a continuous watching mode, and without detecting a further command to skip a portion of an episode:
        generating for display a first episode of the series; and
        in response to conclusion of the first episode:
            automatically skipping end credits of the first episode and title credits of a next episode of the series; and
            automatically generating for display the next episode of the series,
    wherein automatically generating for display the next episode of the series comprises:
        generating for display the next episode of the series immediately after the conclusion of the first episode;
        generating for display a first frame of the next episode immediately after generating for display the last frame of the first episode; and
        buffering frames of the next episode before the conclusion of the first episode.

2. The method of claim 1, wherein receiving the command to play the series in the continuous watching mode comprises:
    receiving a selection of the series; and
    receiving a selection of an option to play the series in the continuous watching mode.

3. The method of claim 1, wherein automatically skipping the end credits of the first episode comprises:
    identifying frames of the first episode that are a part of the end credits; and
    preventing generation for display of the identified frames.

4. The method of claim 1, wherein automatically skipping the title credits of the next episode comprises:
    identifying frames of the next episode that are a part of the title credits; and
    preventing generation for display of the identified frames.

5. The method of claim 1, the method further comprising:
    detecting that the first episode will finish playing after a predetermined time period, and
    wherein the buffering of the frames of the content portion of the next episode is performed in response to the detecting.

6. The method of claim 1, the method further comprising:
    identifying the end credits and the title credits by examining metadata of the episodes of the series.

7. The method of claim 1, the method further comprising:
    identifying the end credits and the title credits by comparing the first episode and the next episode to each other to identify similar portions of the episodes.

8. A system for providing media content for continuous watching, the system comprising:
    input/output circuitry configured to receive a command to play a series in a continuous watching mode, wherein the series comprises a plurality of sequential episodes; and
    control circuitry configured to:
        in response to receiving the command to play the series in a continuous watching mode, and without detecting a further command to skip a portion of an episode:

generate for display a first episode of the series; and
in response to conclusion of the first episode:
  automatically skip end credits of the first episode and title credits of a next episode of the series; and
  automatically generate for display the next episode of the series,
wherein the control circuitry is configured to automatically generate for display the next episode of the series by:
  generating for display the next episode of the series immediately after the conclusion of the first episode;
  generating for display a first frame of the next episode immediately after generating for display the last frame of the first episode; and
  buffering frames of the next episode before the conclusion of the first episode.

9. The system of claim 8, wherein the input/output circuitry is configured to receive the command to play the series in the continuous watching mode by:
  receiving a selection of the series; and
  receiving a selection of an option to play the series in the continuous watching mode.

10. The system of claim 8, wherein the control circuitry is configured to automatically skip the end credits of the first episode by:
  identifying frames of the first episode that are a part of the end credits; and
  preventing generation for display of the identified frames.

11. The system of claim 8, wherein the control circuitry is configured to automatically skip the title credits of the next episode by:
  identifying frames of the next episode that are a part of the title credits; and
  preventing generation for display of the identified frames.

12. The system of claim 8, wherein the control circuitry is configured to:
  detect that the first episode will finish playing after a predetermined time period, and
  wherein the control circuitry is configured to buffer the frames of the content portion of the next episode in response to the detecting.

13. The system of claim 8, wherein the control circuitry is configured to:
  identify the end credits and the title credits by examining metadata of the episodes of the series.

14. The system of claim 8, wherein the control circuitry is configured to:
  identify the end credits and the title credits by comparing the first episode and the next episode to each other to identify similar portions of the episodes.

* * * * *